United States Patent
Cho et al.

(10) Patent No.: US 10,897,607 B2
(45) Date of Patent: *Jan. 19, 2021

(54) MOBILE TERMINAL AND METHOD FOR CONTROLLING THE SAME

(71) Applicant: LG ELECTRONICS INC., Seoul (KR)

(72) Inventors: Ayoung Cho, Seoul (KR); Yunsup Shin, Seoul (KR); Yungwoo Jung, Seoul (KR); Salkmann Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,722

(22) Filed: Dec. 4, 2019

(65) Prior Publication Data
US 2020/0107012 A1    Apr. 2, 2020

Related U.S. Application Data

(63) Continuation of application No. 15/944,458, filed on Apr. 3, 2018, now Pat. No. 10,542,245.
(Continued)

(51) Int. Cl.
*H04N 13/207*     (2018.01)
*G03B 35/10*      (2006.01)
(Continued)

(52) U.S. Cl.
CPC ....... *H04N 13/207* (2018.05); *G01B 11/2513* (2013.01); *G03B 35/00* (2013.01);
(Continued)

(58) Field of Classification Search
CPC ........ G03B 35/10; G03B 35/08; G03B 35/00; H04N 13/0239; H04N 13/0296
(Continued)

(56) References Cited

U.S. PATENT DOCUMENTS 3,555,178 A * 1/1971 Humiston ............. G01C 3/04
                                                         348/31
3,558,974 A * 1/1971 Stewart ................. H01L 24/81
                                                         257/91
(Continued)

FOREIGN PATENT DOCUMENTS

CN      102129152      7/2011
CN      102447780      5/2012
(Continued)

OTHER PUBLICATIONS

Ramesh Jain, "Machine Vision Chapter 11. Depth (pp. 289-308)", McGraw-Hill Series in Computer Science, 1995, 20 pages (Year: 1995).*

(Continued)

*Primary Examiner* — Clayton E. LaBalle
*Assistant Examiner* — Kevin C Butler
(74) *Attorney, Agent, or Firm* — Lee Hong Degerman Kang & Waimey

(57) ABSTRACT

The present invention relates to a mobile terminal including a lighting device and a method for controlling the same. A mobile terminal according to an embodiment of the present invention includes a lighting device; a camera; and a controller configured to capture a 3D image by means of the camera, wherein the lighting device includes a pattern light source configured to emit light having a predetermined pattern; and a surface light source configured to emit uniform light, and wherein the controller controls the lighting device so that the pattern light source and the surface light source alternately emit light.

17 Claims, 10 Drawing Sheets

Related U.S. Application Data

(60) Provisional application No. 62/510,274, filed on May 24, 2017.

(51) Int. Cl.
```
G03B 35/08      (2006.01)
G03B 35/00      (2006.01)
H04N 13/271     (2018.01)
G01B 11/25      (2006.01)
H04N 13/254     (2018.01)
H04M 1/22       (2006.01)
H04N 5/33       (2006.01)
G06T 7/521      (2017.01)
H04N 13/268     (2018.01)
H04M 1/02       (2006.01)
H04N 5/225      (2006.01)
```

(52) U.S. Cl.
CPC ............ *G03B 35/08* (2013.01); *G03B 35/10* (2013.01); *G06T 7/521* (2017.01); *H04M 1/0264* (2013.01); *H04M 1/22* (2013.01); *H04N 5/33* (2013.01); *H04N 13/254* (2018.05); *H04N 13/268* (2018.05); *H04N 13/271* (2018.05); *H04M 2250/52* (2013.01); *H04N 5/2256* (2013.01)

(58) Field of Classification Search
USPC ........................................................ 396/326
See application file for complete search history.

(56) References Cited

U.S. PATENT DOCUMENTS

| | | | | |
|---|---|---|---|---|
| 5,541,723 A * | 7/1996 | Tanaka | G01C 3/085 | 356/3.01 |
| 5,621,529 A * | 4/1997 | Gordon | G01B 11/00 | 250/237 G |
| 5,714,762 A * | 2/1998 | Li | G01B 11/2513 | 250/559.2 |
| 6,125,197 A * | 9/2000 | Mack | G06T 7/521 | 382/154 |
| 6,377,700 B1 * | 4/2002 | Mack | H04N 13/207 | 382/154 |
| 6,495,848 B1 * | 12/2002 | Rubbert | G06T 7/521 | 250/559.22 |
| 6,503,195 B1 * | 1/2003 | Keller | A61B 1/042 | 600/160 |
| 6,549,288 B1 | 4/2003 | Migdal et al. | | |
| 8,369,575 B2 * | 2/2013 | Kim | G01S 17/894 | 382/106 |
| 8,681,321 B2 * | 3/2014 | Pelman | H04N 5/33 | 356/5.01 |
| 8,854,426 B2 * | 10/2014 | Pellman | A63F 13/10 | 348/42 |
| 9,008,355 B2 * | 4/2015 | Markovic | G01S 3/786 | 382/103 |
| 9,135,516 B2 * | 9/2015 | Hoof | G06K 9/4604 | |
| 9,349,040 B2 * | 5/2016 | Brickhill | G06K 9/00355 | |
| 9,361,698 B1 * | 6/2016 | Song | G06T 7/521 | |
| 9,696,427 B2 * | 7/2017 | Wilson | G01S 17/894 | |
| 2003/0052169 A1 * | 3/2003 | Tsikos | G06K 9/26 | 235/454 |
| 2005/0020073 A1 * | 1/2005 | Perry | G01N 21/272 | 438/689 |
| 2007/0263903 A1 * | 11/2007 | St. Hilaire | G01B 11/25 | 382/106 |
| 2008/0159595 A1 * | 7/2008 | Park | G01S 17/48 | 382/106 |
| 2010/0020078 A1 * | 1/2010 | Shpunt | G01B 11/25 | 345/420 |
| 2011/0043609 A1 * | 2/2011 | Choi | G01B 11/2513 | 348/46 |
| 2011/0117958 A1 * | 5/2011 | Kim | H04N 13/356 | 455/556.1 |
| 2011/0228252 A1 * | 9/2011 | Souvestre | G01B 11/002 | 356/5.01 |
| 2012/0056982 A1 * | 3/2012 | Katz | G06F 3/017 | 348/43 |
| 2012/0130257 A1 * | 5/2012 | Heanue | A61B 5/0059 | 600/476 |
| 2012/0294510 A1 * | 11/2012 | Zhang | G06K 9/2036 | 382/154 |
| 2013/0023732 A1 * | 1/2013 | Kim | A61B 1/00193 | 600/166 |
| 2013/0100256 A1 * | 4/2013 | Kirk | G06T 7/593 | 348/48 |
| 2014/0003722 A1 * | 1/2014 | Aviv | G06T 7/521 | 382/182 |
| 2014/0049610 A1 * | 2/2014 | Hudman | G01S 7/4818 | 348/46 |
| 2014/0104592 A1 * | 4/2014 | Tien | G01S 17/89 | 356/5.01 |
| 2014/0267701 A1 * | 9/2014 | Aviv | G01C 11/025 | 348/136 |
| 2014/0313292 A1 * | 10/2014 | Xiong | G06T 7/521 | 348/46 |
| 2014/0313293 A1 * | 10/2014 | Kim | G06T 7/55 | 348/46 |
| 2014/0375541 A1 * | 12/2014 | Nister | G06F 3/013 | 345/156 |
| 2015/0036899 A1 * | 2/2015 | Warm | A61F 9/00825 | 382/128 |
| 2015/0097947 A1 * | 4/2015 | Hudman | G01S 17/89 | 348/136 |
| 2015/0204663 A1 * | 7/2015 | Znamenskiy | G01B 11/2513 | 348/46 |
| 2015/0253123 A1 * | 9/2015 | Braker | G01S 7/4814 | 356/610 |
| 2015/0279016 A1 * | 10/2015 | Kim | G06T 7/80 | 382/154 |
| 2015/0292873 A1 * | 10/2015 | Chou | G01B 11/254 | 348/136 |
| 2015/0304631 A1 * | 10/2015 | Lee | H04N 5/265 | 348/46 |
| 2016/0006914 A1 * | 1/2016 | Neumann | G06F 3/0325 | 348/78 |
| 2016/0044235 A1 * | 2/2016 | Cho | H04N 5/23293 | 348/333.05 |
| 2016/0182891 A1 * | 6/2016 | Ko | H04N 5/2257 | 348/47 |
| 2016/0182892 A1 * | 6/2016 | Ko | G01S 17/894 | 348/46 |
| 2016/0182895 A1 * | 6/2016 | Ko | G01S 7/4817 | 348/46 |
| 2016/0216778 A1 * | 7/2016 | Yu | G06F 3/0317 | |
| 2016/0252346 A1 * | 9/2016 | Bismuth | A41H 1/02 | 356/610 |
| 2016/0356596 A1 * | 12/2016 | Kitamura | G01B 11/254 | |
| 2016/0360074 A1 | 12/2016 | Winer et al. | | |
| 2016/0373728 A1 | 12/2016 | Cho et al. | | |
| 2017/0006235 A1 * | 1/2017 | Cho | H04M 1/0264 | |
| 2017/0026582 A1 * | 1/2017 | Kim | H04N 5/23293 | |
| 2017/0132790 A1 * | 5/2017 | Jeong | G06T 7/50 | |
| 2017/0196451 A1 * | 7/2017 | Tian | A61B 3/113 | |
| 2017/0285764 A1 * | 10/2017 | Kim | H04M 1/72522 | |
| 2017/0287151 A1 * | 10/2017 | Han | G06T 7/521 | |
| 2018/0010907 A1 * | 1/2018 | Forster | G01B 11/2513 | |
| 2018/0106606 A1 * | 4/2018 | Fujita | G01S 17/93 | |
| 2018/0191879 A1 * | 7/2018 | Evans, V | H04N 5/2226 | |
| 2018/0209616 A1 * | 7/2018 | Lee | H01L 33/62 | |
| 2018/0218509 A1 * | 8/2018 | Price | G06F 1/163 | |
| 2018/0241916 A1 * | 8/2018 | Yu | H04N 13/344 | |

(56) References Cited

U.S. PATENT DOCUMENTS

2018/0260967 A1* 9/2018 Bleyer ................ G06T 7/521
2018/0343438 A1 11/2018 Cho et al.

FOREIGN PATENT DOCUMENTS

| CN | 103053167 | | 4/2013 | |
|---|---|---|---|---|
| CN | 104634277 | | 5/2015 | |
| CN | 106406002 | | 2/2017 | |
| KR | 1020130071056 | * | 12/2011 | ............... G06F 8/40 |
| KR | 20160149068 | | 12/2016 | |

OTHER PUBLICATIONS

Qiuchen Du et al, Depth extraction for a structured light system based on mismatched image pair rectification using a virtual camera, The Institutuon of Engineering and Technology, Jun. 22, 2016, 8 pages (Year: 2016).*
United States Patent and Trademark Office U.S. Appl. No. 15/944,458, Office Action dated Oct. 3, 2018, 16 pages.
Korean Intellectual Property Office Application No. 10-2018-0015856, Office Action dated Apr. 9, 2019, 5 pages.
European Patent Office Application Serial No. 18173075.5, Search Report dated Oct. 23, 2018, 11 pages.
The State Intellectual Property Office of the People's Republic of China Application Serial No. 201810487394.6, Office Action dated Aug. 27, 2020, 18 pages.

* cited by examiner (a)  (b)

(a)

(b)

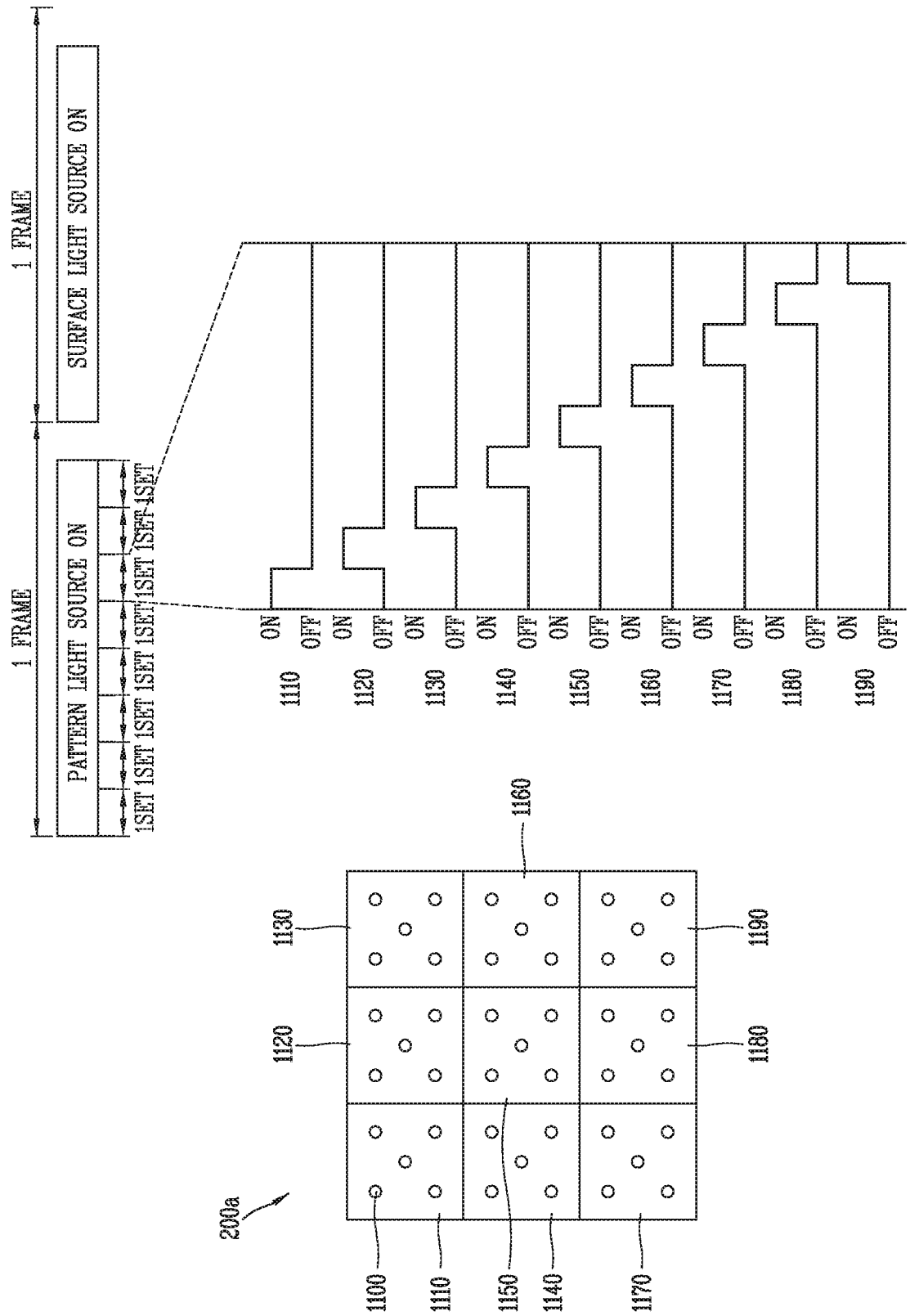

MOBILE TERMINAL AND METHOD FOR CONTROLLING THE SAME

CROSS-REFERENCE TO RELATED APPLICATIONS

This application is a continuation of U.S. patent application Ser. No. 15/944,458, filed on Apr. 3, 2018, now U.S. Pat. No. 10,542,245, which claims the benefit of earlier filing date and right of priority to Korean Application No. 10-2018-0015856, filed on Feb. 8, 2018, and also claims the benefit of U.S. Provisional Application No. 62/510,274, filed on May 24, 2017, the contents of which are all incorporated by reference herein in their entirety.

BACKGROUND OF THE INVENTION

1. Field of the Invention

The present invention relates to a mobile terminal including a lighting device, and more particularly, to a mobile terminal having a lighting device used to capture a three-dimensional (3D) image.

2. Description of the Related Art

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Recently, as performance of cameras has advanced, various functions using cameras have been developed. For example, development of functions to capture a high quality still image or video or generate a 3D image using depth information (or a depth value) of an image received through a camera have been actively developed.

For those various functions using cameras, a role of a light emitting device is important. Here, the light emitting device serves to emit light to a space corresponding to an image received through a camera.

Thus, the necessity to develop a light emitting device for performing various functions using a camera and a method for controlling a light emitting device have emerged.

SUMMARY OF THE INVENTION

Therefore, an aspect of the detailed description is to provide a mobile terminal including a lighting device capable of irradiating light, which is used for extracting depth information of an image captured through a camera, in an optimized manner, and a method for controlling the same.

Still another aspect of the detailed description is to provide a mobile terminal including a lighting device formed to irradiate optical spots larger than the number of light sources to a subject in an optimized manner, and a method for controlling the same.

Still another aspect of the detailed description is to provide a mobile terminal capable of capturing an optimized 3D image using a surface light source and a pattern light source and a method for controlling the same.

Still another aspect of the detailed description is to a mobile terminal including a lighting device and capable of emitting heat generated in a plurality of light emitting devices to the outside through an optimized method.

A mobile terminal according to an embodiment of the present invention includes a lighting device; a camera; and a controller configured to capture a 3D image by means of the camera, wherein the lighting device includes a pattern light source configured to emit light having a predetermined pattern; and a surface light source configured to emit uniform light, and wherein the controller controls the lighting device so that the pattern light source and the surface light source alternately emit light.

In an embodiment, the controller may light off the surface light source while the pattern light source emits light and may light off the pattern light source while the surface light source emits light.

In an embodiment, the controller may control the lighting device so that the pattern light source is lit on when the camera captures a first frame and the surface light source is lit on when the camera captures a second frame after capturing the first frame.

In an embodiment, the controller may light on the pattern light source when the camera captures a third frame after capturing the second frame and may light on the surface light source when the camera captures a fourth frame after capturing the third frame.

In an embodiment, the controller may light on the pattern light source for at least some time while the camera captures the first frame and may light on the surface light source for at least some time while the camera captures the second frame.

In an embodiment, the controller may extract depth information through the first frame captured while the pattern light source emits light and may extract edge information of an object and brightness information by using the second frame captured while the surface light source emits light.

In an embodiment, the controller may generate a single 3D image by using the first frame and the second frame captured through the camera.

In an embodiment, the pattern light source may include a plurality of light emitting devices, the plurality of light emitting devices may be grouped into a plurality of groups, and the controller may control the plurality of groups by group.

In an embodiment, the controller may sequentially emit the plurality of groups in a predetermined order.

In an embodiment, the controller may light on the plurality of groups such that times during which the plurality of groups emit light do not overlap one another.

In an embodiment, all of the plurality of groups sequentially emitting light may be defined as a single set, and the controller may light on the plurality of groups according to a plurality of sets while the camera captures the first frame.

In an embodiment, a time during which the single set is performed may be constant, and the number of the plurality of sets performed while the first frame is being captured varies depending on the time during which the first frame is captured.

According to the present invention, the present invention can provide a mobile terminal capable of improving quality of depth information by means of a single camera and a dual lighting device (i.e., a surface light source and a pattern light source).

Also, the present invention can provide a new mobile terminal capable of extracting depth information and edge information by means of only one camera without needing to use a plurality of cameras by alternately lighting on a surface light source and a pattern light source.

Also, the present invention may provide a new control method capable of performing face recognition, eye recognition, and fusion mapping by using a black-and-white image acquired when light is emitted by a surface light source and a depth image acquired when light is emitted by a pattern light source.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 10 and 11 are conceptual diagrams illustrating a method of controlling a lighting device.

DETAILED DESCRIPTION OF THE INVENTION

Figure 1A:
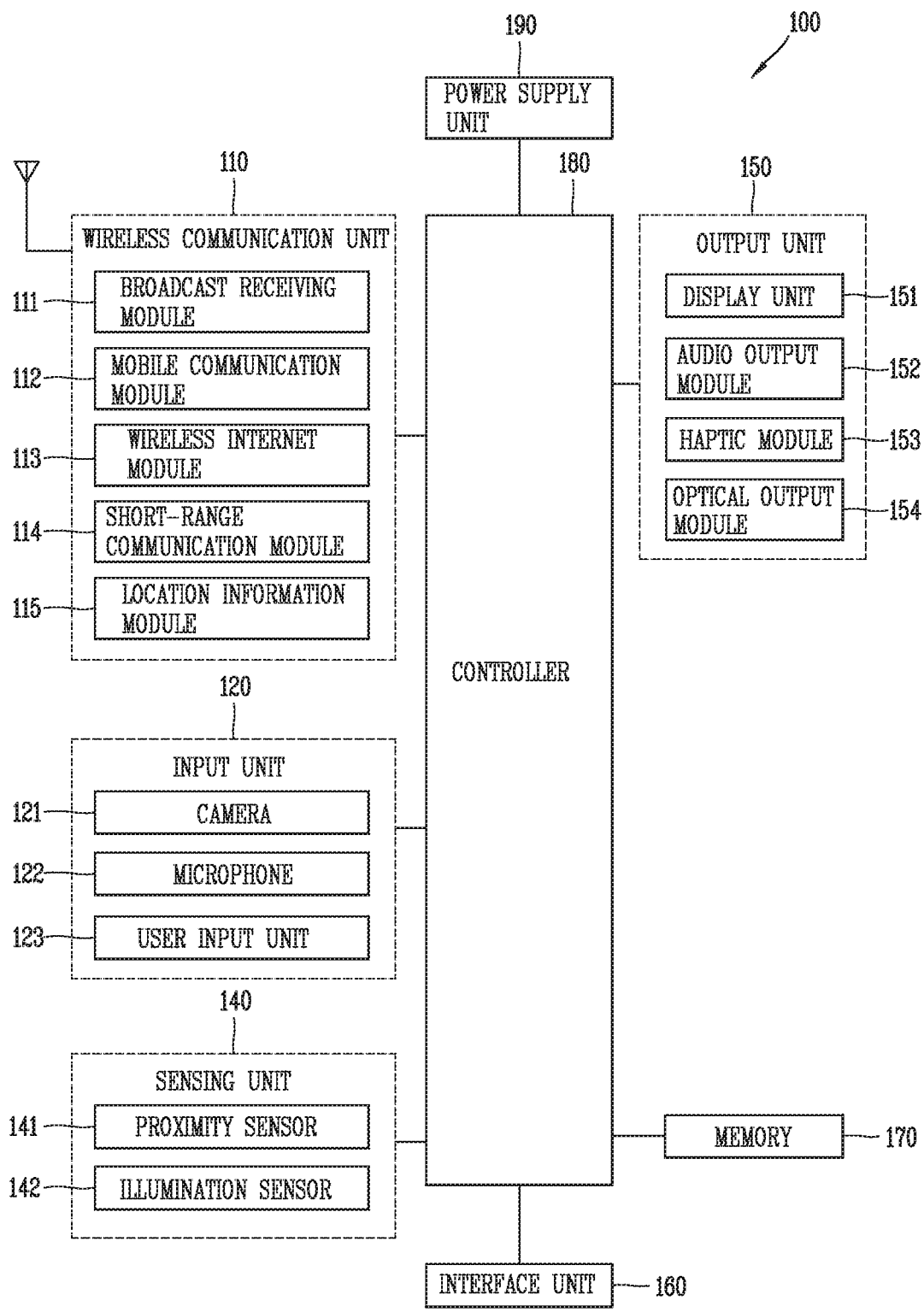
FIG. 1A is a block diagram illustrating a mobile terminal associated with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
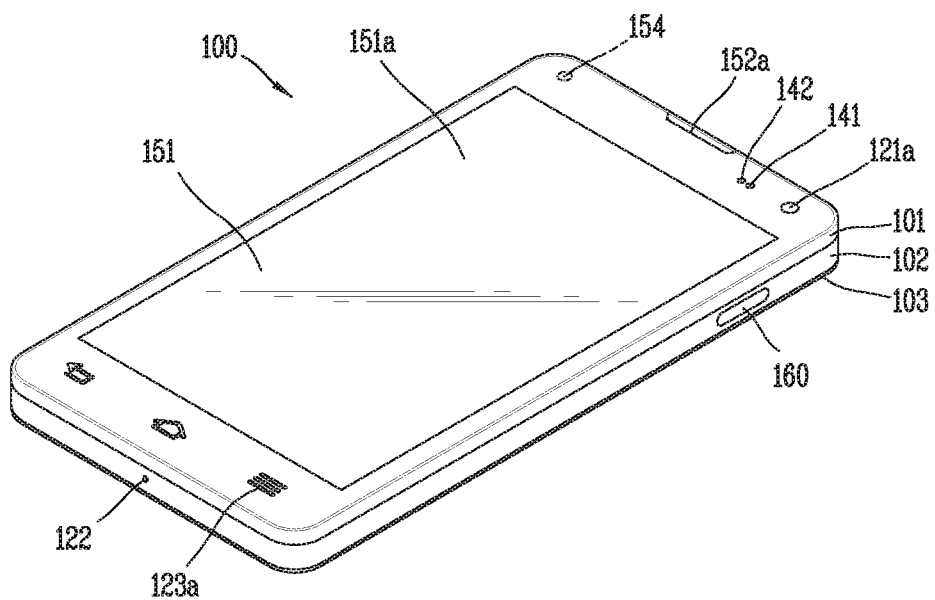
FIGS. 1B and 1C are conceptual diagrams showing an example of a mobile terminal associated with the present invention, which is seen in different directions.
Figure 1C:
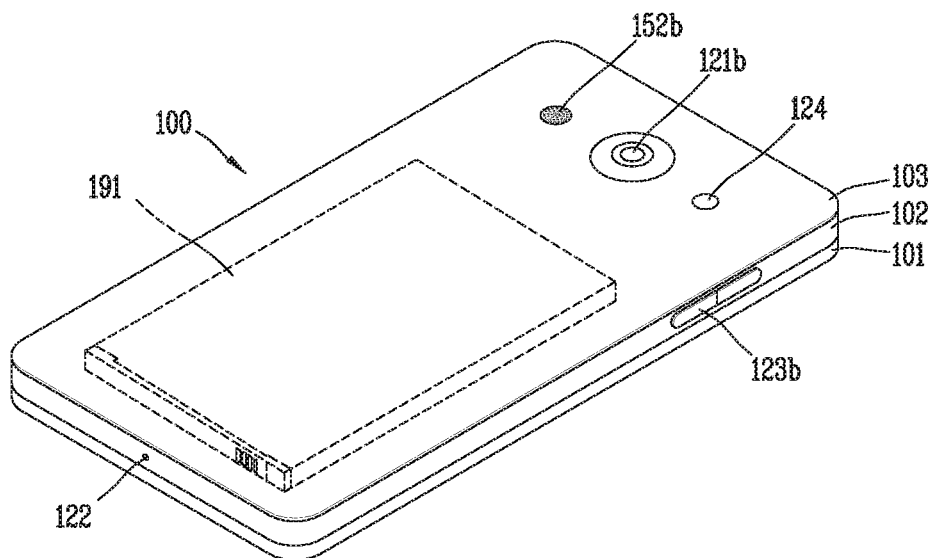

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the electronic device 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the electronic device 100. Another example of the accessory may be a touch pen for assisting or extending a touch input onto a touch screen.

Meanwhile, the mobile terminal related to the present disclosure may extract (detect, determine, sense) depth information from an image captured through a camera, using the camera and a lighting device.

Also, the mobile terminal related to the present disclosure may capture (or generate) a 3D image using the camera and the lighting device. For example, the mobile terminal related to the present disclosure may convert (generate) a 2D image captured through the camera into a 3D image on the basis of the extracted depth information. In another example, the mobile terminal related to the present disclosure may determine a distance to a subject on the basis of light irradiated from the lighting device and capture (or generate) a 3D image through the camera on the basis of the distance to the subject.

Hereinafter, a method for extracting depth information from an image captured using the camera and the lighting device will be described in detail with reference to the accompanying drawings. Hereinafter, extracting depth information from an image captured through the camera will be described, but related contents may also be inferred and applied to capturing (or generating a 3D image in the same/like manner.

The mobile terminal 100 related to the present disclosure may extract depth information received (or captured) through the camera 121 (please refer to FIG. 1A).

The image received through the camera may be referred to as a preview image. In detail, the preview image may refer to an image received through the camera in real time. The preview image may be changed as the mobile terminal having the camera 121 is moved by an external force or as a subject moves.

An image captured through the camera may refer to an image obtained by capturing a preview image, for example. For example, the image may be captured as an image capture button output on the display unit of the mobile terminal is touched, as a user's gesture associated to capture a preview image is sensed through the preview image, or as a physical button provided in the mobile terminal is pressed.

An image described in this disclosure may refer to at least one of a preview image and a captured image.

Depth information described in this disclosure may be a depth value. The depth information may refer to a distance (or a distance value) between a subject corresponding pixels included in the image and the mobile terminal (specifically, the camera).

For example, in cases where a subject corresponding to a specific pixel of the image and the mobile terminal is n, depth information of the specific pixel may be a specific value corresponding to n. The specific value corresponding to n may be n or a value converted by a preset algorithm.

Also, the depth information may be a value corresponding to a z axis perpendicular to an x axis and a y axis in cases where coordinates of the image are set to the x axis and the y axis perpendicular to the x axis. An absolute value of the depth information may be increased as a distance between the subject and the mobile terminal is increased.

The depth information may be utilized in various fields. For example, the depth information may be used for capturing/generating a 3D stereoscopic image (stereoscopy), used for generating 3D printing data used in a 3D printer, or used for detecting movement of an object (or subject) around the mobile terminal.

The mobile terminal related to the present disclosure may extract depth information of an image received (or captured) through the camera in various manners. For example, the controller 180 may extract depth information through a stereo vision scheme of extracting depth information using at least two cameras, a structure light scheme of extracting depth information using light emitting devices disposed to form a preset pattern, a time of flight (ToF) scheme of extracting depth information on the basis of time during which light emitted from a light emitting device is reflected to be returned, or any combination thereof.

Hereinafter, extracting depth information using the structure light scheme, among the aforementioned schemes, will be largely described.

The structure light scheme is a scheme of emitting light to a subject by controlling a plurality of light emitting devices disposed to have a preset pattern, sensing light reflected from the subject, and subsequently extracting depth information on the basis of the sensed light (or a pattern of sensed light).

In detail, the structure light scheme is a scheme of extracting depth information by irradiating light to a subject from a plurality of light emitting devices disposed to have a preset pattern and calculating a shift amount (or a shift amount of a reflected light pattern) of reflected light returned with respect to the preset pattern.

For example, the controller 180 of the mobile terminal related to the present disclosure controls the plurality of light emitting devices disposed to have a preset pattern to emit light to the subject. Thereafter, the controller 180 of the mobile terminal may sense light reflected and returned from the subject through the sensing unit 140 of FIG. 1A.

Here, the controller 180 may extract depth information of an image received through the camera 121 on the basis of the sensing result. For example, the controller 180 may extract depth information of the image received through the camera 121 by comparing the pattern formed by light which is reflected and returned with the preset pattern.

In detail, the controller 180 may extract depth information of the image received through the camera 121 by comparing a preset pattern in which a plurality of light emitting devices emit light to the subject (or a preset pattern in which the plurality of light emitting devices are disposed) and a pattern formed by reflected and returned light (or optical spot) and calculating a shift amount regarding each of the reflected and returned light (or optical spot) with respect to the preset pattern (or a changed form, a changed distance, a changed direction, and the like) or a shift amount regarding a pattern of returned light.

In another example, in the structure light scheme, the controller 180 may extract depth information of the image received through the camera 121 by comparing time during which light emitted from the plurality of light emitting devices is reflected to be returned and strength of reflected and returned light.

To this end, the plurality of light emitting devices may be formed to emit light to a space corresponding to the image received through the camera 121.

The preset pattern may be determined (or set) by the user or may be predetermined when a product of the mobile terminal was manufactured. Also, the preset pattern may be changed according to a user request or by controlling of the controller.

Also, the plurality of light emitting devices may emit infrared light. Also, the light emitting devices may be laser diodes changing an electrical signal into an optical signal.

For example, the light emitting devices may be a vertical cavity surface emitting laser (VCSEL).

In the present disclosure, depth information of the image may be extracted through one camera (infrared camera or a 3D camera) using the structure light scheme, and even when the subject has a single color, depth information may be extracted. Also, accuracy regarding depth information may be enhanced by combining the structure light scheme and a stereo vision scheme using at least two cameras or combining the structure light scheme and the ToF scheme.

The ToF scheme may be a scheme of measuring depth information of an image by calculating a time during which light directly irradiated to an object is returned as reflected light The stereo vision scheme may be a scheme of symmetrically disposing a plurality of cameras (e.g., two cameras) and extracting depth information of an image received through the camera using disparity (or a difference in distance, space) between an image received through a first camera (e.g., a left camera) among the plurality of cameras and an image received through a second camera (e.g., a right camera) among the plurality of cameras.

The mobile terminal related to the present disclosure may use a combination of the stereo vision scheme and the structure light scheme.

Figure 2:
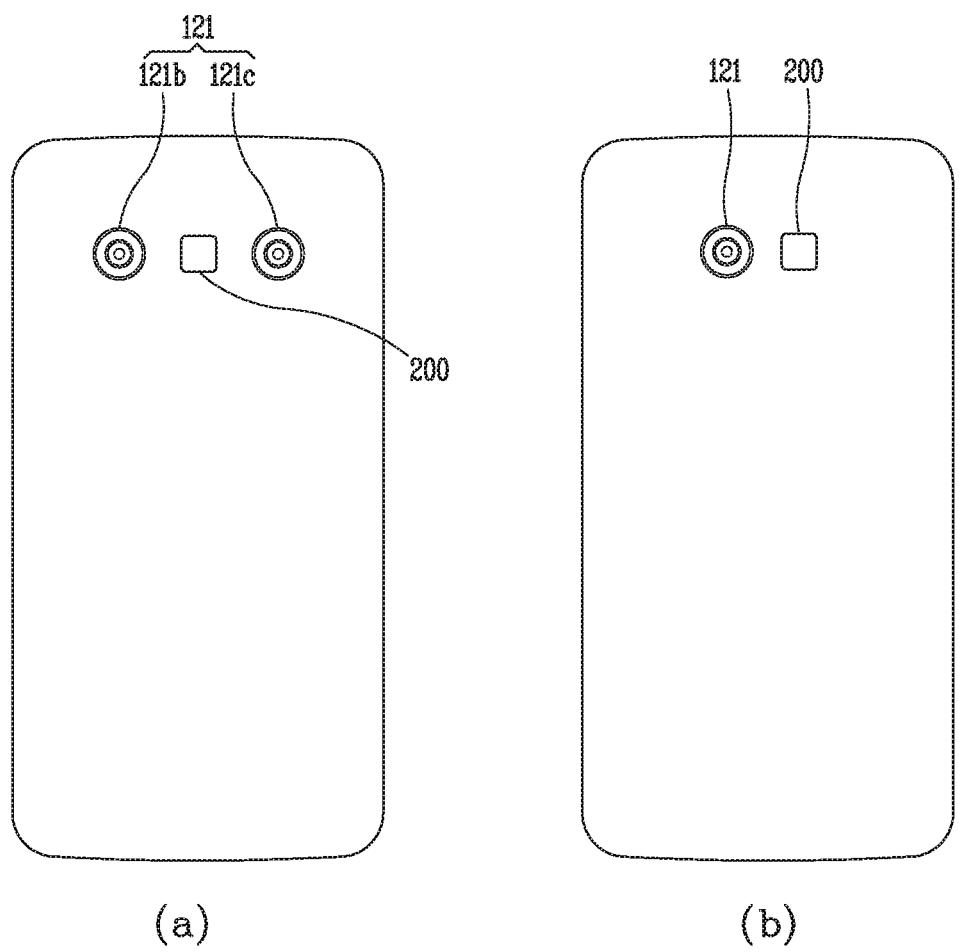
FIG. 2 is a conceptual diagram illustrating a camera and a lighting device included in a mobile terminal associated with the present invention.

FIG. 2 is a conceptual view illustrating a camera and a lighting device provided in a mobile terminal related to the present disclosure.

As illustrated in (a) of FIG. 2, the mobile terminal related to the present disclosure may have a plurality of cameras 121b and 121c on one surface thereof. Here, one surface of the mobile terminal 100 may be at least one of a rear surface, a front surface, and a side surface of the main body of the mobile terminal.

In (a) of FIG. 2, it is illustrated that the plurality of cameras 121b and 121c are provided on the rear surface of the main body of the mobile terminal.

Also, a lighting device 200 of the present disclosure may be provided on one surface on which the plurality of cameras 121b and 121c are provided.

The lighting device 200 may include a plurality of light emitting devices, and as described above, the lighting device 200 may irradiate light having a preset pattern to extract depth information of an image through the structure light scheme. Here, the plurality of light emitting devices (or a plurality of light sources) may be, for example VCSEL.

As illustrated in (a) of FIG. 2, the mobile terminal of the present disclosure may extract depth information of an image received through the cameras by combining the stereo vision scheme and the structure light scheme using the plurality of cameras 121a and 121b and the lighting device 200 capable of irradiating light of a preset pattern.

However, without being limited thereto, although the plurality of cameras 121a and 121b are provided on one surface of the main body of the mobile terminal, the mobile terminal 100 of the present disclosure may extract depth information of an image received through the cameras using any one of the stereo vision scheme, the structure light scheme, and the ToF scheme or by combining at least two schemes.

However, without being limited thereto, as illustrated in (b) of FIG. 2, the mobile terminal 100 of the present disclosure may extract depth information of an image received through the camera using one camera 121 and the lighting device 200, using only the structure light scheme, using only the ToF scheme, or using a combination of the structure light scheme and the ToF scheme.

Meanwhile, the lighting device 200 provided in the mobile terminal 100 related to the present disclosure may irradiate light to form (or have) a predetermined pattern as described above in the structure light scheme. The lighting device 200 may include a plurality of light emitting devices. Here, the light emitting devices may be the aforementioned VCSEL.

The plurality of light emitting devices may be formed to have a preset pattern or only some of the light emitting devices may be turned on to irradiate light in a preset pattern.

The plurality of light emitting devices (or a die including the plurality of light emitting devices) may be referred to as a VCSEL array, for example.

The controller 180 of the mobile terminal related to the present disclosure may individually control each of the plurality of light emitting devices (the plurality of light sources) included in the lighting device 200. In detail, the controller 180 may individually turn on or off the plurality of light emitting devices provided in the lighting device 200. Also, the controller 180 may individually control emission intensity of the plurality of light emitting devices provided in the lighting device 200. Also, the controller 180 may individually control (determine) an emission timing of the plurality of light emitting devices provided in the lighting device 200.

The lighting device 200 may be individually turned on or off, varied in emission intensity, or changed in an emission timing under the control of the controller 180. Accordingly, a pattern (i.e., a preset pattern) of light irradiated from the lighting device 200 may be varied.

In this manner, in the lighting device 200 included in the mobile terminal of the present disclosure, a pattern (or intensity of light, a timing of light) of irradiated light may be varied by individually controlling the plurality of light emitting devices (the plurality of VCSELs), and in this point of view, the lighting device 200 may be referred to as active lighting.

Meanwhile, the lighting device 200 related to the present disclosure may irradiate light (or optical spot) of a preset pattern such that the light may be used for extracting depth information of an image. Here, the optical spot may refer to a region (or point) of a subject to which light is irradiated or a region (or a point) of the mobile terminal (or the lighting device 200, the camera, or the sensing unit) to which light reflected from a subject is irradiated.

Here, in the present disclosure, since the plurality of light emitting devices included in the lighting device 200 are laser diodes (e.g., VCSELs), and thus, when the plurality of light emitting devices emit light, light (laser) is irradiated to a narrow region (or point) of a subject. Accordingly, an optical spot may be formed in the subject. Also, in the present disclosure, on the basis of light (laser) reflected to be returned from the subject to the mobile terminal, an optical spot irradiated to the subject may be detected.

Meanwhile, the lighting device 200 may include a diffractive optical element (DOE). The DOE may be formed to diffract light (laser) output from the light emitting devices.

The DOE may diffract light output from the light emitting device into a plurality of light beams. In this disclosure, diffracting light (laser) may be understood as splitting light, duplicating light, refracting a portion of light, and the like. In cases where one light output from the light emitting device is diffracted (or split) into a plurality of light beams by the DOE, the sum of intensity of the plurality of light beams may be equal to intensity of the one light.

In other words, intensity of each of the plurality of light beams (i.e., any one of the plurality of light beams diffracted by the DOE) may be weaker than intensity of the one light beam before entering the DOE.

Meanwhile, the lighting device of the present disclosure may output a larger number of light beams (optical spots) than the number of the plurality of light emitting devices using the DOE.

For example, in cases where the number of the plurality of light emitting devices is n and the number of light beams (optical spots) output when one light beam passes through the DOE is m, the lighting device 200 of the present disclosure may output n*m number of light beams (optical spots) (or irradiate the n*m number of light beams to a subject).

In the present disclosure, the lighting device 200 may have a plurality of light emitting devices and a DOE, and the DOE may diffract light output from the plurality of light emitting devices such that a predetermined pattern is formed with respect to each of the plurality of light emitting devices.

That is, the lighting device 200 of the present disclosure may include the DOE for diffracting light such that each of the light sources has the predetermined pattern. In other words, the DOE included in the lighting device 200 may diffract light such that one light beam output from one light emitting device forms the predetermined pattern. Accordingly, a plurality of light beams output from the plurality of light emitting devices may be diffracted to form the predetermined pattern and pass through the DOE.

In contrast, a related art lighting device (or a related art DOE) is formed to diffract light output from a plurality of light emitting devices such that a plurality of patterns are formed by the plurality of light emitting devices.

The related art lighting technique will be described in detail with reference to FIG. 3.

Figure 3:
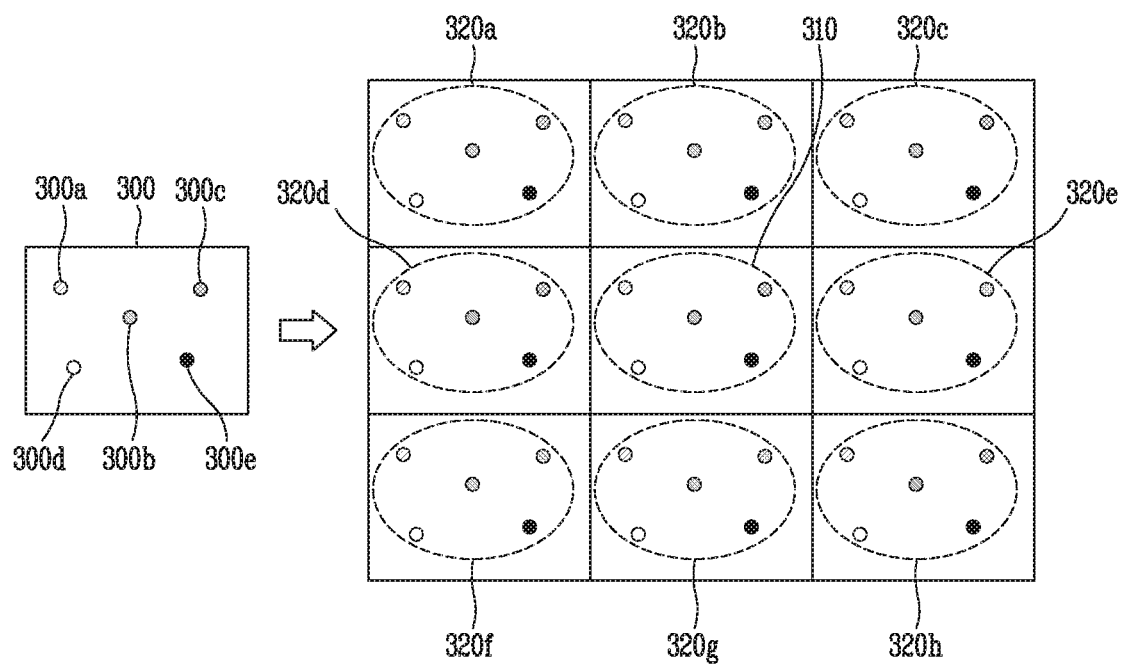
FIG. 3 is a conceptual view illustrating conventional lighting technology.

FIG. 3 is a conceptual view illustrating the related art lighting technique.

In FIG. 3, for the purposes of description, an embodiment in which light (or light pattern) incident to the DOE is duplicated 3 by 3.

Referring to FIG. 3, a light source unit 300 of the related art lighting device may include a plurality of light emitting devices 300*a*, 300*b*, 300*c*, 300*d*, and 300*e*. In the light source unit 300, the plurality of light emitting devices 300*a*, 300*b*, 300*c*, 300*d*, and 300*e* may be disposed to form a specific pattern, or only some of the plurality of light emitting devices 300*a*, 300*b*, 300*c*, 300*d*, and 300*e*, among a larger number of light emitting devices, may be turned on to form the specific pattern.

Here, when a plurality of light beams output from the plurality of light emitting devices pass through the DOE, the plurality of light beams may be split into a first type of light beam 310 not diffracted by the DOE and a second type of light beams 320*a*, 320*b*, 320*c*, 320*d*, 320*e*, 320*f*, 320*g*, 320*h* diffracted by the DOE.

When any one light beam is irradiated to the DOE, a portion of the light may pass through the DOE, without being diffracted by the DOE (or non-diffracted or refracted). That is, a portion of the light may pass through the DOE, in a state of maintaining straightness (or straightly), without being diffracted or refracted by the DOE.

In this manner, in this disclosure, the non-diffracted portion of light will be termed a first type of light. Here, the first type of light may refer to zero-order light (or 0th light). Referring to FIG. 3, the number of first type of light beams 310 may be equal to the number of the plurality of light emitting devices 300*a*, 300*b*, 300*c*, 300*d*, and 300*e*.

Meanwhile, when any one light beam is irradiated to the DOE, the other portion excluding the one portion of light beam is diffracted (or refracted) by the DOE. Here, the other remaining portion of light may be diffracted (or refracted) in a plurality of directions, i.e., in different directions. In the present disclosure, the other diffracted (or refracted) remaining portion of light will be termed a second type of light. Here, the second type of light may refer to a first-order light (or first light).

Referring to FIG. 3, the number of a plurality of second type of light beams 320*a*, 320*b*, 320*c*, 320*d*, 320*e*, 320*f*, 320*g*, 320*h* diffracted by the DOE may be varied depending on design of the DOE and may generally be larger than the number of a plurality of light emitting devices.

Here, the first type of light, which is zero-order light, and the second type of light, which is first-order light, may pass through one DOE, for example. For example, as illustrated in FIG. 3, in cases where light output from the plurality of light emitting devices passes through only one DOE, the corresponding light may include a first type of light (zero-order light) and a second type of light (first-order light).

Meanwhile, when light passes through at least two DOE, the first type of light and the second type of light may include light of different orders.

For example, light output from a single optical element passes through a first DOE, the light may be split into non-diffracted zero-order light and diffracted first-order light.

Thereafter, when the zero-order light and the first-order light pass through a second DOE, the corresponding light which has passed through the second DOE may include zero-order light and first-order light which have not been diffracted by the second DOE and first-order light and second-order light which have been diffracted by the second DOE. Here, the diffracted first-order light may be light which has been diffracted from the zero-order light, and the diffracted second-order light may be light which has been diffracted from the first-order light.

Here, the first type of light may include zero-order light and first-order light which has not been diffracted by the second DOE after passing through the first DOE. Also, the second type of light may include first-order light and second-order light which have been diffracted by the second DOE after passing through the first DOE.

That is, the first type of light described in this disclosure may refer to light which is not diffracted by a final DOE, when at least one DOE is provided.

Also, the second type of light may refer to light diffracted by the final DOE.

That is, the first type of light may include light not diffracted by the final DOE, among a plurality of light beams irradiated to a subject. Also, the second type of light may include light diffracted by the final DOE, among the plurality of light beams irradiated to the subject.

In the related art, as illustrated in FIG. 3, the lighting device (or the DOE) may duplicate a light pattern by patterns (or in units of patterns) formed by a plurality of light emitting devices. In detail, the related art lighting device may diffract (duplicate) a light pattern emitted from the plurality of light emitting devices by the DOE such that light patterns do not overlap by patterns.

To this end, the related art lighting device includes a DOE formed such that an angle between the first type of light (e.g., zero-order light) and the second type of light (e.g., the first-order light) is an angle at which a pattern formed by the first type of light and a pattern of the second type of light do not overlap.

Accordingly, a pattern formed by the plurality of light emitting devices, a pattern formed by the first type of light 310, and patterns formed respectively by the second type of light beams 320a, 320b, . . . 320h may be the same as illustrated in FIG. 3.

Also, the related art lighting device may irradiate light such that the pattern formed by the first type of light 310 and the patterns formed by the second type of light beams (320a, 320b, . . . , 320h) do not overlap each other.

In other words, the related art lighting device may have a DOE irradiating light such that a region to which the first type of light 310 is irradiated (or a region formed by connecting points to which the first type of light is irradiated) and regions to which the second type of light beams 320a, 320b, . . . , 320h are irradiated (or a region formed by connecting points to which the second type of light is irradiated) do not overlap each other.

That is, the related art lighting device simply duplicates a pattern formed by light output from the plurality of light emitting devices into a plurality of light beams by patterns and irradiate the same such that the patterns do not overlap, whereby the related lighting device merely serves to expand a field of view (FOV) to which light is irradiated, while irradiating optical spots greater than the number of the plurality of light emitting devices. f Accordingly, in the related art, since the first type of light and the second type of light are irradiated to the subject such that they do not overlap each other, it is impossible to increase the number of light beams (optical spots) irradiated per unit area (that is, it is impossible to increase density of light (optical spots)).

In other words, as illustrated in FIG. 3, since the related art lighting device duplicates a pattern of light output from the plurality of light emitting devices 300a, 300b, . . . , 300e not to overlap by patterns, thereby merely increasing the number of output light beams (optical spots) and the FOV to which light is irradiated, without changing density of light indicating the number of light beams (optical spots) per unit area.

Meanwhile, the present disclosure provides a lighting device capable of irradiating light such that the number of light beams (optical spots) irradiated per unit area is increased (that is, such that density of light (optical spots) is increased).

Hereinafter, a lighting device related to the present disclosure will be described in detail with reference to the accompanying drawings.

Figure 4:
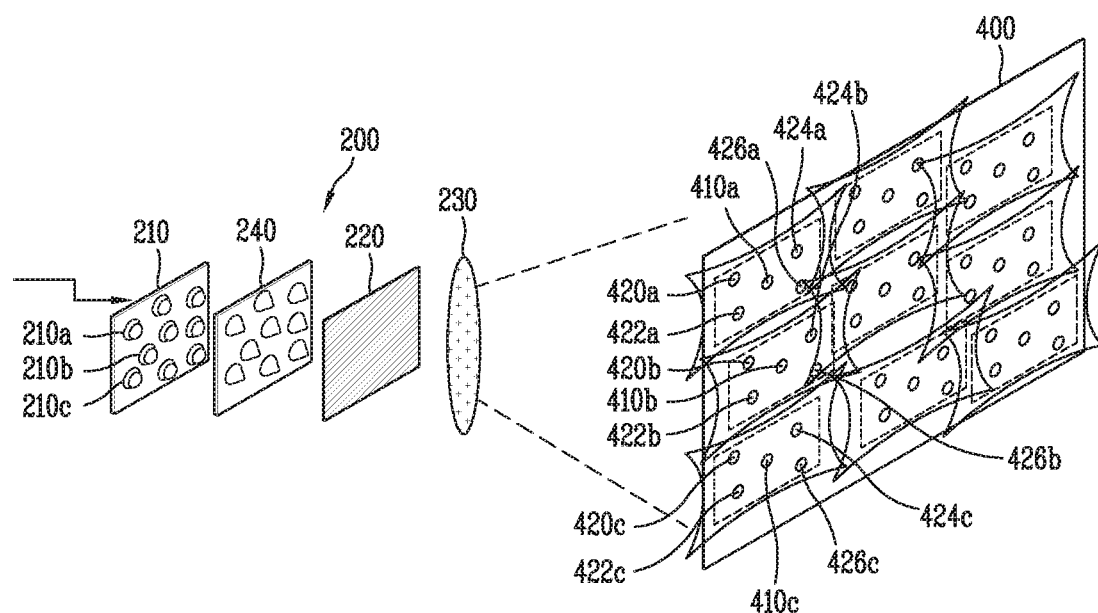
FIG. 4 is a conceptual view illustrating a lighting device included in a mobile terminal according to an embodiment of the present invention.
Figure 4:
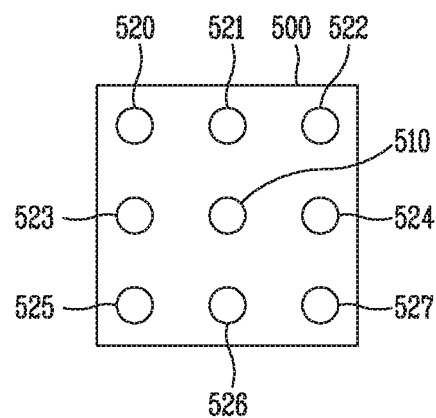

FIG. 4 is a conceptual view illustrating a lighting device provided in a mobile terminal according to an embodiment of the present disclosure, and FIGS. 5, 6, 7, and 8 are conceptual views illustrating a lighting technology using a lighting device of the present disclosure.

First, referring to (a) of FIG. 4, a lighting device 200 related to the present disclosure may include a plurality of light emitting devices 210a, 210b, 210c, . . . and a DOE 220 diffracting a portion of light output from each of the plurality of light emitting devices.

The plurality of light emitting devices may be laser diodes and, for example, may be vertical cavity surface emitting lasers (VCSELs).

The plurality of light emitting devices may be provided in a die and may be disposed to form a specific pattern or at least some of the plurality of light emitting devices forming the specific pattern may be turned on. The specific pattern may be determined when the lighting device is generated or may be varied by changing light emitting devices which are turned on.

The die including the plurality of light emitting devices 210a, 210b, 210c, . . . may be termed a light emitting unit 210. Hereinafter, the plurality of light emitting devices may be denoted by the reference numerals 210a, 210, 210c, . . . , and the die including the plurality of light emitting devices will be denoted by reference numeral 210.

The DOE 220 may be disposed in a direction in which the plurality of light emitting devices output light. The DOE 220 may diffract a portion of light output from the light emitting devices and do not diffract the other remaining portion of light. That is, the DOE 220 may diffract a portion of light output form the light emitting devices and allow the same to pass therethrough, and allow the other remaining portion of light to pass therethrough in a non-diffracted state (that is, straightly).

Referring to (a) of FIG. 4, light output from the plurality of light emitting devices and passing through the DOE 220 may include a plurality of first type of light beams 410a, 410b, 410c, . . . not diffracted by the DOE 220 and a plurality of second type of light beams 420a, 422a, 424a, 426a, 420b, 422b, 424b, 426b, 420c, 422c, 424c, 426c, . . . diffracted by the DOE 220.

The plurality of first type of light beams may refer to light beams passing through the DOE 220 straightly (without being diffracted) after being output from the plurality of light emitting devices. Also, the plurality of second type of light beams may refer to light beams diffracted by the DOE 220 and passing through the DOE 220 after being output from the plurality of light emitting devices.

The DOE 220 may diffract (split) one light into a plurality of light beams. Here, the DOE 220 may diffract light to have a specific pattern with respect to each of the light emitting devices, rather than diffracting light by patterns in a state of maintaining patterns of a plurality of light beams output from the plurality of light emitting devices, and in this sense, the DOE 220 is different from the related art DOE (please refer to FIG. 3).

That is, the DOE of the present disclosure may diffract incident light such that a specific pattern is formed per light output from the light emitting device.

Meanwhile, the lighting device of the present disclosure may further include various types of refractive optical elements (e.g., a microlens array 240, a reflective lens, a projection lens 230, a collimator lens, a grating cell array (GCA), a mirror/prism array, a fly eye lens, a double refraction element, etc.) The lighting device of the present disclosure may include at least one of the refractive optical elements, and disposition positions of the refractive optical elements and refractive optical elements may vary.

For example, the microlens array 240 may be disposed between the plurality of light emitting devices 210 and the refractive optical element 220, and the projection lens 230 may be disposed in a direction in which light which has passed through the DOE travels such that light beams which have passed through the DOE may be incident thereto.

The various lenses may be used to refract light output from the plurality of light emitting devices such that the light may be incident to an optimized position of the DOE or change a FOV in which the light which has passed through the DOE travels.

For example, microlenses provided in the microlens array 240 may be disposed in positions corresponding to the number of the plurality of light emitting devices 210a, 210b, 210c, 210d, and 210e.

The microlens array 240 may refract light output from the plurality of light emitting devices such that a plurality of light beams output from the plurality of light emitting devices are incident to be perpendicular to the DOE.

In another example, the microlens array 240 may refract light beams output from the plurality of light emitting devices such that all of the plurality of light beams output from the light emitting devices disposed in different positions are incident to the center of the DOE.

The projection lens 230 may be formed such that an FOV in which the plurality of first type of light and the plurality of second type of light which have passed through the DOE 220 travel is large. That is, when a plurality of light beams which have passed through the DOE 220 are incident, the projection lens 230 may refract the plurality of light beams and output to have an FOV larger than an FOV of the plurality of incident light beams.

The FOV in which the plurality of light beams passed through the projection lens 230 travel may be larger than a FOV in which a plurality of light beams not passed through the projection lens 230 travel.

The FOV may be determined when a product is released or may be determined according to a user design, and when the projection lens is formed to have a variable bending modulus, the FOV may be varied.

In the present disclosure, it is described that the DOE splits (duplicates) incident light. However, the present disclosure is not limited thereto and the lighting device of the present disclosure may also be applied to a case of using the aforementioned refractive optical element instead of the DOE or to a case of combining the DOE and the refractive optical element.

Descriptions of the DOE hereinafter may also be inferred and applied to a case of using the refractive optical element or to case of combining the DOE and the refractive optical element in the same/similar manner.

The DOE 220 of the present disclosure may duplicate light output from one light emitting device such that light output from one light emitting device has a specific pattern, rather than duplicating light by patterns formed by light output from a plurality of light emitting devices (that is, a pattern in which the plurality of light emitting devices are disposed).

For example, in (a) of FIG. 4, it is illustrated that light output from one light emitting device is split into five light beams through the DOE 220. Here, among the five light beams, a first type of light is one 410*a*, and second type of light may be the other remaining four light beams 420*a*, 422*a*, 424*a*, and 426*a*. Optical spots to which the five light beams are irradiated may form a specific pattern.

The DOE of the present disclosure may be provided to split one light output from one light emitting device to form a specific pattern, rather than duplicating a pattern in which a plurality of light emitting devices are disposed by patterns as illustrated in FIG. 3. In this manner, splitting, by the DOE 220, one light to form a specific pattern may be applied to light output from each of the plurality of light emitting devices.

In this case, to a plane 400 spaced apart from the lighting device 200 by a predetermined distance, light beams respectively output from the light emitting devices are irradiated to have a specific form, rather than that forms of the pattern in which the plurality of light emitting devices are disposed are duplicated and irradiated by patterns.

In this manner, the DOE of the present disclosure is different from the related art DOE of FIG. 3 in that, although the plurality of light emitting devices are provided, one light output from each of the light emitting devices is split into several light beams to form a specific pattern.

Hereinafter, as illustrated in (b) of FIG. 4, a case in which the DOE 220 diffracts (splits) incident one light beam into 3 by 3 form (predetermined pattern) 500 will be described as an example. Here, one light beam irradiated to the center of the 3 by 3 form may be a first type of light (e.g., zero-order light) and the other remaining eight light beams may be second type of light (e.g., first-order light).

The DOE 220 of the present disclosure may diffract (split) each of a plurality of light beams respectively output from the plurality of light emitting devices into the 3 by 3 form (predetermined pattern) and allow the same to transmit therethrough. That is, the DOE 220 of the present disclosure may split light output from each of the plurality of light emitting devices to form a predetermined pattern. Here, among the plurality of light beams forming the predetermined pattern, a first type of light (i.e., non-diffracted light) is one 510 and a second of light (i.e., refracted light) may be the other remaining eight light beams 520, 521, 522, 523, 524, 525, 526, and 527.

Thus, when light is irradiated from the lighting device having the plurality of light emitting devices through the DOE, a plurality of first type of light beams and second type of light beams may be irradiated. Also, the number of the plurality of first type of light beams may be equal to the number of the plurality of light emitting devices.

Figure 5:
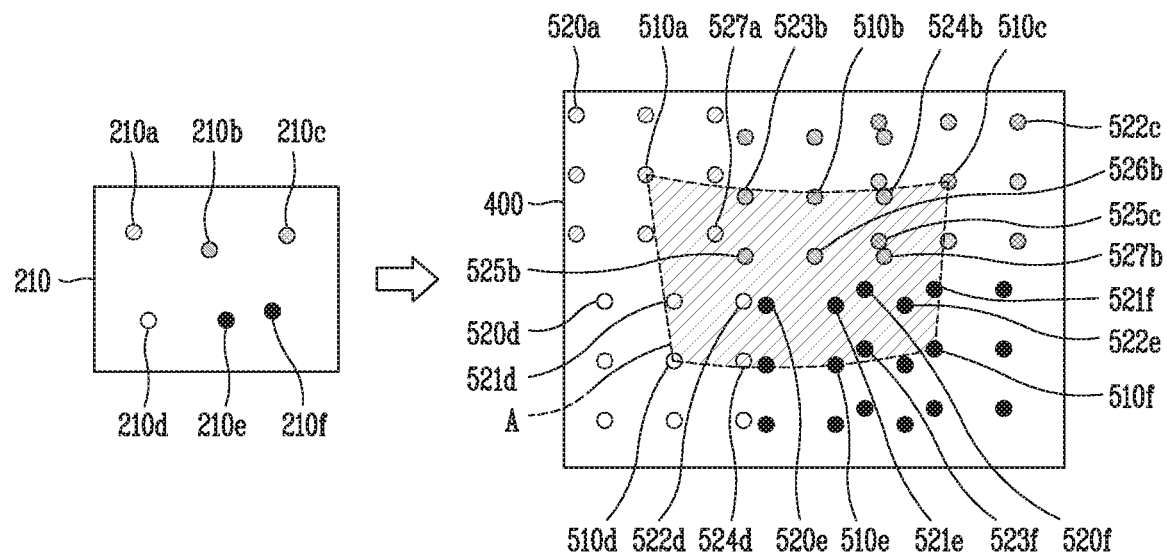
FIGS. 5, 6, 7, and 8 are conceptual diagrams illustrating lighting technology using a lighting device of the present invention.

For example, as illustrated in FIG. 5, when the plurality of light emitting devices is six devices and one light output from each light source is split into 9 light beams to form a predetermined pattern (3 by 3), the number of first type of light beams may be 6 and the number of second type of light beams may be 48 (6×8).

Referring to FIG. 5, the lighting device 200 of the present disclosure may include a plurality of light emitting devices 210*a*, 210*b*, 210*c*, 210*d*, 210*e*, and 210*f*.

The DOE 220 included in the lighting device 200 may be positioned in a direction (e.g., an optical axis direction) in which light beams output from the plurality of light emitting devices travel.

The DOE 220 of the present disclosure may diffract (split or duplicate) incident light output from each of the plurality of light emitting devices to form a predetermined pattern (e.g., 3 by 3). That is, the DOE of the present disclosure may diffract (split) light by light sources such that one light beam output from each of the light emitting devices forms a predetermined pattern, rather than diffracting (splitting) a plurality of light beams, incident to correspond to the pattern in which the plurality of light emitting devices are disposed, to overlap by patterns.

In this case, light beams passing through the DOE 220 after being output from the plurality of light emitting devices may include a plurality of first type of light beams 510*a*, 510*b*, 510*c*, 510*d*, and 510*e* not diffracted by the DOE and a plurality of second type of light beams 520*a*, . . . , 527*a*, 520*b*, . . . , 527*b*, . . . , 520*f*, . . . , 527*f* diffracted by the DOE.

The DOE 220 of the present disclosure may diffract some of light beams output from the plurality of light emitting devices such that at least some of the plurality of second type of light beams are irradiated to the inside of a region formed by connecting the plurality of first type of light beams.

For example, as illustrated in FIG. 5, the DOE 220 of the present disclosure may diffract (split) one light output from each of the light emitting devices to have a predetermined pattern by light emitting devices.

Accordingly, as illustrated in FIG. 5, at least some (e.g., 527*a*, 523*b*, 524*b*, 525*b*, 526*b*, 527*b*, 525*c*, 521*d*, 522*d*, 524*d*, 520*e*, 521*e*, 522*e*, 520*f*, 521*f*, and 523*f*) of the plurality of second type of light beams may be irradiated to the inside of the region A formed by connecting the plurality of first type of light beams 510*a*, 510*b*, 510*c*, 510*d*, 510*e*, 510*f*.

Here, the other remaining light beams excluding the at least some of the plurality of second type of light beams may not be irradiated to the inside of the region formed by connecting the plurality of first type of light beams (that is, may be irradiated to a region outside the region A).

The region A formed by connecting the plurality of first type of light beams may be an internal region of a figure formed by connecting at least three optical spots among optical spots to which the plurality of first type of light beams are irradiated.

Preferably, the region A may be a region formed when optical spots selected to have the largest width, among optical spots to which the plurality of first type of light beams are irradiated, are connected, but the present disclosure is not limited thereto.

In detail, as illustrated in FIG. 5, when a plurality of first type of light beams and a plurality of second type of light beams are irradiated to a plane spaced apart from the lighting device 200 by a predetermined distance, at least some of the plurality of second type of light beams may be irradiated to (or included in) the inside of the region formed by connecting the plurality of first type of irradiated light beams.

In this manner, in the lighting device of the present disclosure, since the DOE diffracts (splits) one light output from each of the plurality of light emitting devices to have a predetermined pattern, when a plurality of light beams respectively output from the plurality of light emitting devices are incident to the DOE, at least some of the plurality of second type of light beams are irradiated to (included in) the inside of a region formed by connecting the plurality of first type of light beams.

Meanwhile, referring to FIG. 3, since the related art lighting device diffracts (splits) a plurality of light beams respectively output from the plurality of light emitting devices and irradiate the same such that the plurality of light beams do not overlap each other by patterns formed by the plurality of light emitting devices, the second type of light beams 320a, 320b, . . . , 320h cannot be irradiated to (included in) the region formed by connecting the first type of light beams 310.

Figure 6:
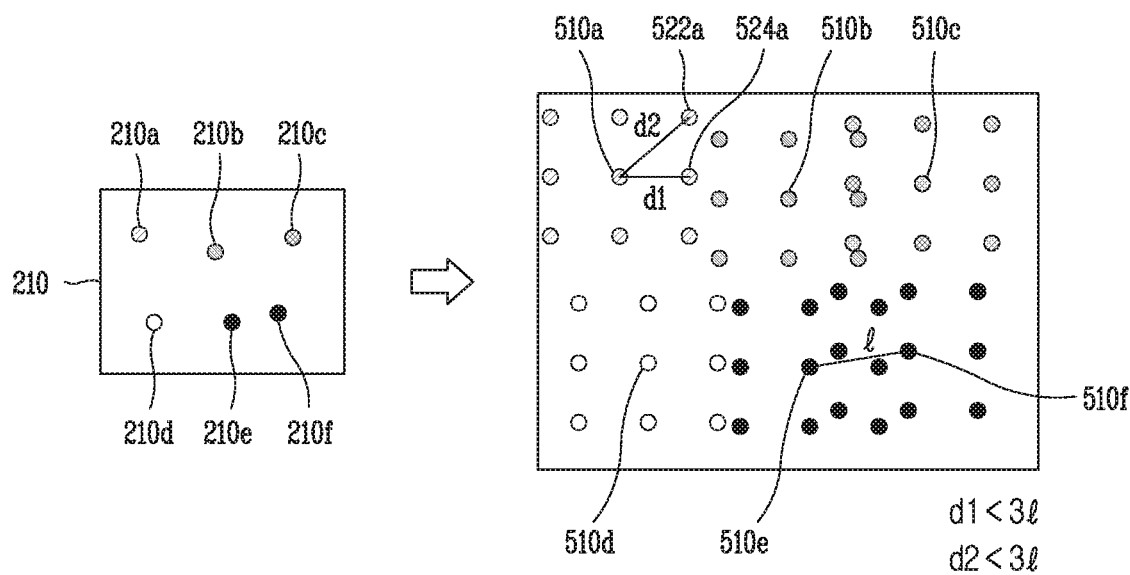

Meanwhile, referring to FIG. 6, the DOE 220 of the present disclosure may diffract (split or allow for transmission of) light beams output from the plurality of light emitting devices such that a distance between any one of the plurality of first type of light beams and a second type of light beam related to the any one light beam is three times a minimum distance between the plurality of first type of light beams.

For example, the plurality of first type of light beams and the plurality of second type of light beams transmitted through the DOE may be illustrated on a plane spaced apart from the lighting device 200 by a predetermined distance.

Here, distances d1 and d2 between any one light beam 510a among the plurality of first type of light beams and second type of light beams 522a and 524a related to the any one light beam irradiated to the plane may be three times a minimum distance (a distance between 510e and 510f in the case of FIG. 6) between the plurality of first type of light beams irradiated to the plane.

That is, in cases where a first type of light and a second type of light split from one light form a predetermined pattern, the first type of light beam 510a forming the predetermined pattern and the second type of light beams 520a, . . . , 520f forming the predetermined pattern may be understood as light beams related to each other.

Any one light beam (e.g., 510a) among the plurality of first type of light beams and the second type of light beams 520a, . . . , 520f related to the any one light beam may be light beams related to each other.

In other words, a distance between the any one light beam among the first type of light beams and the second type of light beam related to the any one light beam may refer to a distance between a non-diffracted light beam and a diffracted light beam when the any one light beam has passed through the DOE. The distance between the non-diffracted light beam and the diffracted light beam may have various values and may have any value. Preferably, however, the distances d1 and d2 between the non-diffracted light beam and the diffracted light beam may refer to a maximum distance d2.

To sum up, the DOE of the present disclosure may allow light beams output from the plurality of light emitting devices to transmit therethrough such that a (maximum) distance between the non-diffracted light beam 510a and the diffracted beam 522a or 524a ((maximum) distance between the first type of light beam and the second type of light beam) does not exceed three times the minimum distance between the plurality of non-diffracted light beams (the plurality of first type of light beams).

Also, the distance between the any one light beam and the second type of light beam related to the any one light beam (or the distance between the light beams split from one light or distance between the first type of light beam and the second type of light beam split from one light) may not exceed three times the minimum distance between the plurality of first type of light beams (i.e., d1<3l or d2<3l).

In FIG. 6, it is illustrated that light is diffracted (split) such that the distance between any one light beam among the plurality of first type of light beams and the second type of light beam related to the any one light beam is smaller by one time than the minimum distance between the plurality of first type of light beams.

However, the DOE of the present disclosure may be provided to irradiate light such that the distance between the first type of light beam and the second type of light beam split from one light is within three times the minimum distance between the plurality of first type of light beams. The three times is a result derived from an experimental value obtaining optimized efficiency.

Meanwhile, referring to FIG. 3, in the related art lighting device, since light is split (duplicated) by patterns, light should be irradiated such that a distance between any one of the first type of light beams and a second type of light beam related to the any one light beam is three times or greater than a minimum distance between the first type of light beams. This is because the related art lighting device should split (duplicate) light such that light patterns do not overlap by the patterns in which the plurality of light emitting devices are disposed.

Figure 7:
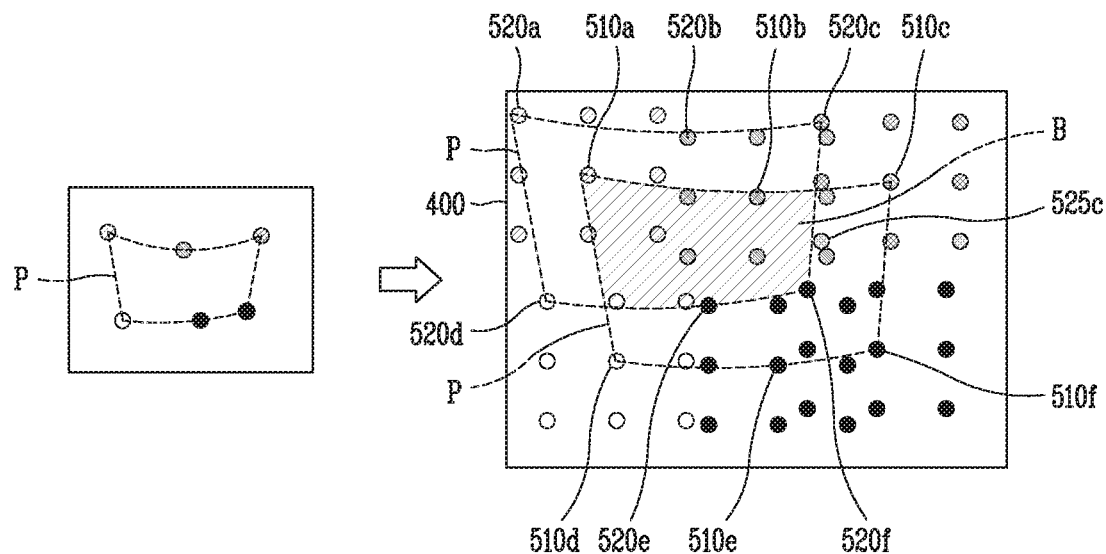

Meanwhile, referring to FIG. 7, the plurality of light emitting devices of the present disclosure may be disposed to form a specific pattern P.

Here, the DOE of the present disclosure diffracts one light irradiated from each light emitting device such that each light emitting device has a predetermined pattern (3 by 3). Here, since one light irradiated from each of the light emitting devices is diffracted to have the same predetermined pattern, a plurality of first type of light beams 510a, 510b, 510c, 510d, 510e, and 510f may form the specific pattern P corresponding to a disposition pattern of the light emitting devices, and the plurality of second type of light beams 520a, 520b, 520c, 520d, 520e, 520f may also form the specific pattern P.

That is, as illustrated in FIG. 7, the plurality of first type of light beams 510a, 510b, 510c, 510d, 510e, and 510f and the second type of light beams 520a, 520b, 520c, 520d, 520e, 520f diffracted (split or refracted) in the same direction as that of the first type of light beams, among the plurality of second type of light beams, may be irradiated to have (form) the specific pattern P corresponding to the disposition pattern P of the plurality of light emitting devices.

Here, a portion B of a first region occupied by the specific pattern P formed by the plurality of first type of light beams and a portion B of a second region occupied by the specific pattern P formed by the plurality of second type of light beams (specifically, light beams diffracted in the same direction among the plurality of second type of light beams) may overlap each other.

This is because the DOE of the present disclosure diffracts light from each of the plurality of light emitting devices to have a predetermined pattern (3 by 3) and allows light to transmit therethrough such that a distance between the first type of light beam (non-diffracted light beam) and the second type of light beam (diffracted light beam) split from one light is within three times a minimum distance between the plurality of first type of light beams (non-diffracted light beams).

In this manner, the region occupied by the pattern formed by the plurality of first type of light beams and the region occupied by the pattern formed by the plurality of second type of light beams (the pattern formed by the plurality of second type of light beams diffracted in the same direction) may partially overlap.

Meanwhile, referring to FIG. 3, since the related art lighting device split (duplicate) the plurality of light beams output from the plurality of light emitting devices not to overlap by patterns in which the plurality of light emitting devices are disposed, a region occupied by the pattern of the first type of light beam 310 and a region occupied by the pattern of the second type of light beam 320a do not overlap each other.

By the lighting technology described above, the lighting device of the present disclosure may increase the number (i.e., density of light) of light beams (optical spots) irradiated per unit area C.

Figure 8:
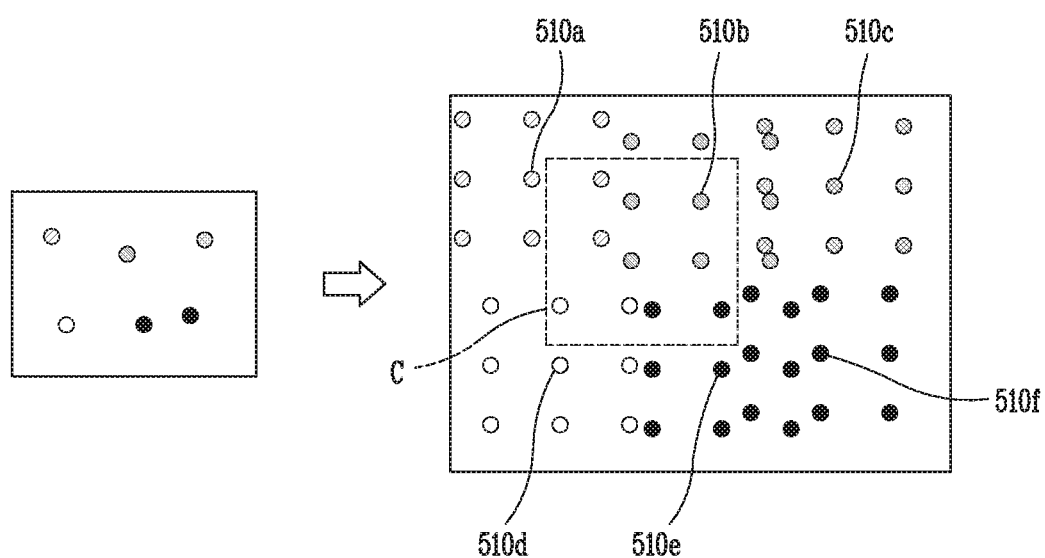

Referring to FIG. 8, as the number of the plurality of second type of light beams diffracted by the DOE 220 is increased, density of the first and second type of light beams may be increased. In other words, as the number of the plurality of second type of light beams which have passed through the DOE 220 is increased, density (i.e., the number of light beams (optical spots) irradiated per unit area C) of the first and second types of light beams may be increased.

Meanwhile, as illustrated in FIG. 3, in the related art lighting device (lighting technology), no matter how many the second type of light beams diffracted by the DOE is increased, the number (i.e., density of first and second types of light beams) of light beams (optical spots) per unit area C is uniform. This is because the related art lighting device duplicates a plurality of light beams output from the plurality of light emitting devices by patterns in which the plurality of light emitting devices are disposed.

According to the present disclosure, since light output from a light source can be diffracted (or split) into a plurality of light beams using the DOE, a lighting device capable of irradiating the number of optical spots larger than the number of light sources to a subject with a smaller number of light sources and a mobile terminal including the lighting device may be provided.

Accordingly, since a smaller number of light sources are required, cost may be reduced and a size of the terminal may be reduced.

Also, according to the present disclosure, since a light source is not duplicated (or split) by a pattern formed by a plurality of light sources but each of the light sources is duplicated (or split) by light sources, a new lighting device capable of increasing the number of optical spots per unit area, i.e., density of optical spots, may be provided.

Hereinafter, the lighting device that has been described with reference to FIGS. 2 to 8 will be referred to as a pattern light source.

The mobile terminal associated with the present invention may acquire depth information, edge information, and brightness information without needing to perform calibration by means of a single camera and a dual lighting device (i.e., a surface light source and a pattern light source).

The mobile terminal of the present invention using a single camera and a dual lighting device will be described below with reference to the accompanying drawings.

Figure 9:
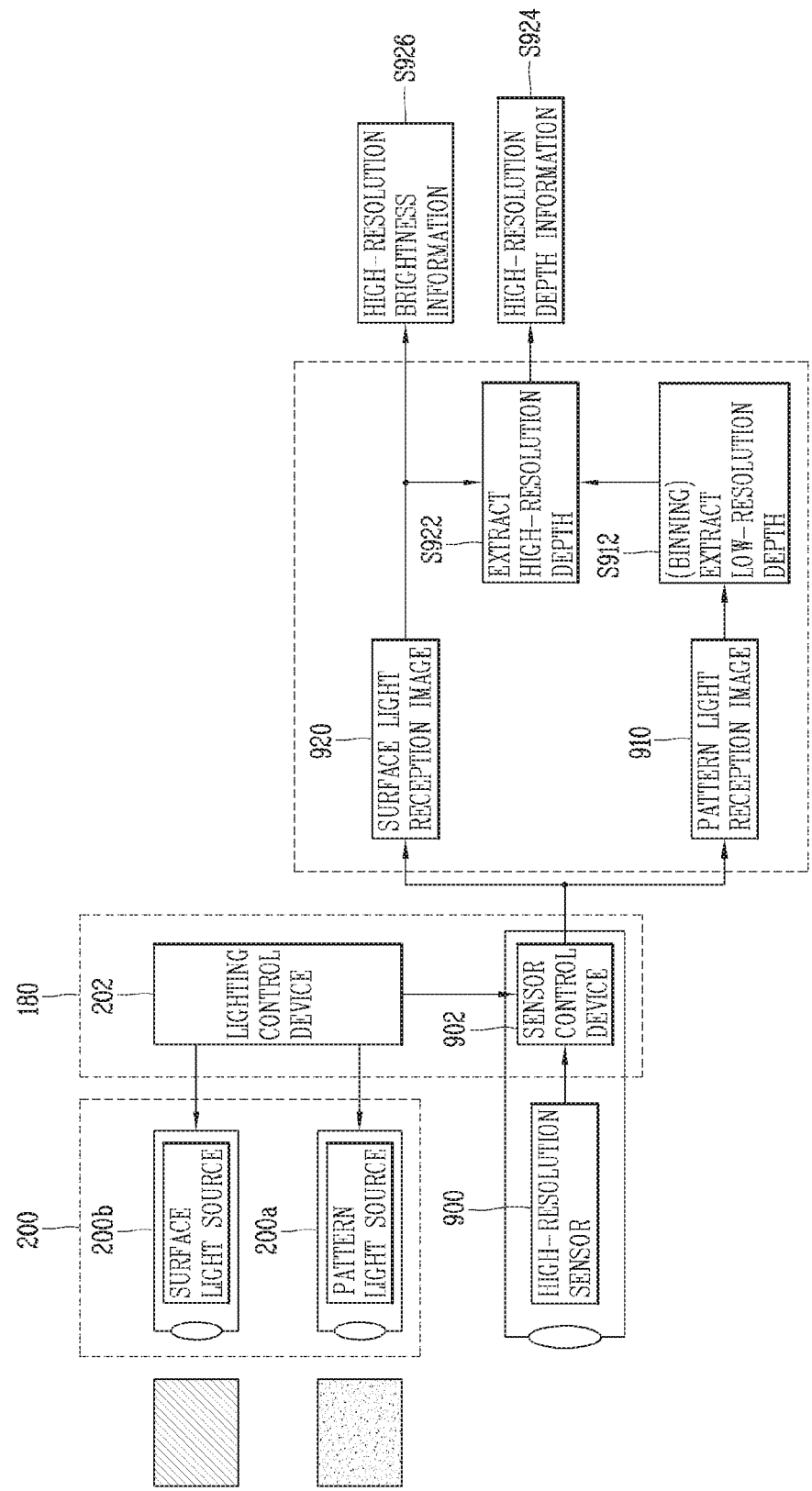
FIG. 9 is a conceptual diagram illustrating a mobile terminal of the present invention.
Figure 10:
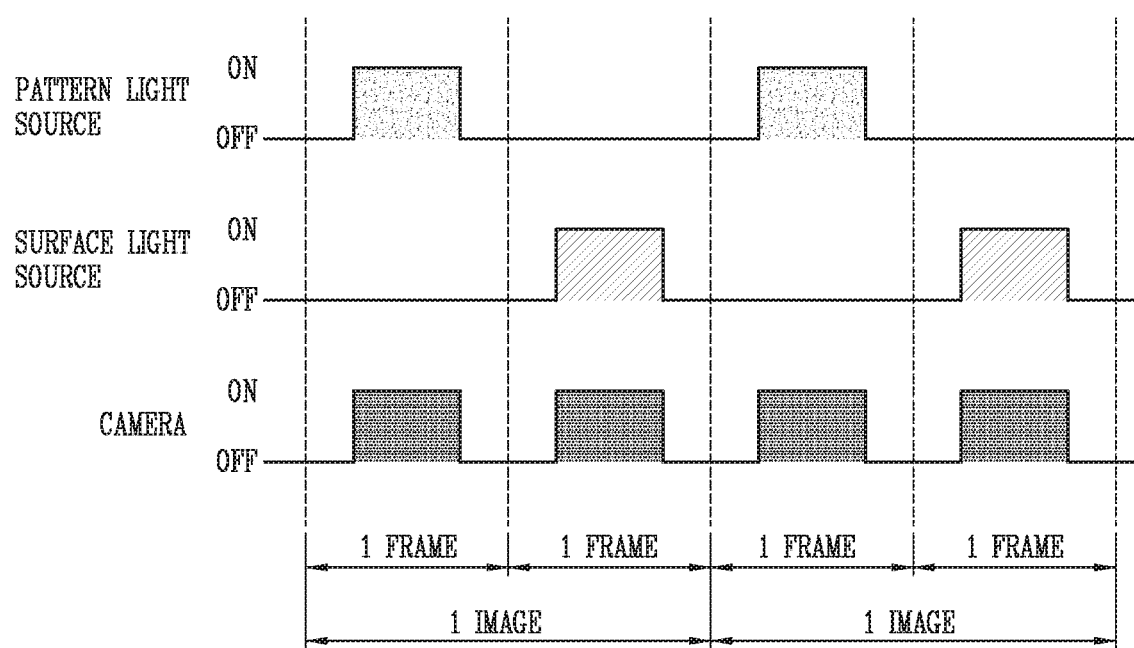

FIG. 9 is a conceptual diagram illustrating a mobile terminal of the present invention, and FIGS. 10 and 11 are conceptual diagrams illustrating a method of controlling a lighting device First, the mobile terminal according to an embodiment of the present invention may include a lighting device 200.

The lighting device 200 may include a pattern light source 200a and a surface light source 200b.

The pattern light source 200a may be formed to emit light with a predetermined pattern. The lighting device that has been described with reference to FIGS. 2 to 8 may be a pattern light source (or a pattern lighting device) because it emits light in a predetermined pattern.

The predetermined pattern refers to a light pattern in which light output from a pattern light source is emitted to an object, depending on locations at which a plurality of vertical-cavity surface-emitting lasers (VCSELs), a light duplication method of a diffractive optical element, or the like.

In detail, the pattern light source may include a plurality of VCSELs (and a diffractive optical element) so that a plurality of light spots are emitted to an object in a predetermined pattern.

As an example, when a diffractive optical element is not provided in a lighting device, the plurality of VCSELs may be provided in a die and arranged according to a predetermine pattern so that a plurality of light spots are emitted to an object in the predetermined pattern.

Meanwhile, the surface light source 200b may be formed to emit uniform light.

For example, the surface light source 200b may be formed to uniformly emit light to a target area (space).

For example, the same amount of light may be emitted to a first area in which light output from the surface light source 200b is to be emitted and a second area different from the first area, and the same intensity (brightness) of light may be applied to each area.

As shown in FIG. 9, the lighting device 200 of the present invention may include the pattern light source 200a and the surface light source 200b.

Here, the pattern light source 200a and the surface light source 200b may output infrared light. As an example, the infrared light emitted from the pattern light source 200a and the surface light source 200b may be 940 nm.

A camera 121 of the present invention may include a high-resolution sensor 900. As an example, the high-resolution sensor 900 may be an infrared sensor.

When the high-resolution sensor 900 is an infrared sensor, the camera 121 of the present invention may be referred to as an infrared camera (or an IR camera).

The high-resolution sensor 900 may be formed to sense only light output by the lighting device 200 (or a wavelength of light output by the lighting device 200). For example, when the infrared light output by the pattern light source 200a and the surface light source 200b has a wavelength of 940 nm, the high-resolution sensor 900 may be formed to receive only light with a wavelength of 940 nm.

The controller 180 of the present invention may include a lighting control device 202 configured to control the lighting device 200 and a sensor control device 902 configured to control the high-resolution sensor 900.

That is, it can be understood that operations/functions/controls of the lighting control device 202 and the sensor control device 902 are performed by the controller 180.

Also, it can be understood that the pattern light source 200a, the surface light source 200b, and the lighting control device 202 are included in a lighting device (or a lighting module) capable of being electrically connected to or disconnected from and physically attached to or detached from the mobile terminal.

Also, it can be understood that the high-resolution sensor 900 and the sensor control device 902 is included in a camera (or a camera module) capable of being electrically connected to or disconnected from and physically attached to or detached from the mobile terminal.

The controller 180 may capture a three-dimensional (3D) image by means of the lighting device 200 and the camera 121.

In this case, it should be understood that the capturing of a 3D image conceptually includes extracting depth information, extracting edge information, extracting brightness information, and the like.

As described above, the lighting device 200 may include a pattern light source 200a configured to emit light with a predetermined pattern and a surface light source 200b configured to uniform light.

The pattern light source 200a may be the lighting device that has been described with reference to FIGS. 2 to 8.

The controller 180 (or the lighting control device 202) may independently control the pattern light source 200a and the surface light source 200b.

Also, the controller 180 may control the pattern light source 200a and the surface light source 200b according to a predetermined method in order to extract high-resolution depth information by means of a single camera (e.g., an infrared camera).

For example, the controller 180 may control the lighting device 200 so that the pattern light source 200a and the surface light source 200b alternately emit light.

Generally, as technology for extracting depth information by using lighting, there are a structured light method, a stereo method, a time of flight (ToF), and the like, as described above.

In order to extract high-resolution depth information, the structured light method and the stereo method need a high-resolution sensor and dense pattern light output, which causes an increase in computation.

An RGB-depth(D) combination method that uses high-resolution information in low-resolution depth information (a method of combining low-resolution depth information and high-resolution image of a general RGB sensor) has been proposed. However, the RGB-depth(D) combination method needs precise spatial calibration of two pieces of information.

The ToF method needs a special sensor using a phase difference of lighting. As resolution increases, a cost increases correspondingly.

According to the present invention, in order to solve the above problems, it is possible to extract high-resolution depth information without needing to perform spatial calibration by means of a single camera (e.g., an infrared camera), the pattern light source 200a, and the surface light source 200b.

In detail, the controller 180 may alternately output pattern light emitted by the pattern light source 200a and surface light emitted by the surface light source 200b depending on frames in which the camera 121 (or the high-resolution sensor 900) receives (acquires) an image.

For example, the controller 180 may light off (i.e., may not light on) the surface light source 200b while the pattern light source 200a emits light and may light off the pattern light source 200a while the surface light source 200b emits light.

For example, referring to FIG. 10, the controller 180 may control the lighting device 200 to light on the pattern light source 200a when the camera 121 captures a first frame and to light on the surface light source 200b when the camera captures a second frame after capturing the first frame.

In detail, the pattern light source 200a may be turned on and the surface light source 200b may be turned off while the first frame is being captured, and the surface light source 200b may be turned on and the pattern light source 200a may be turned off while the second frame is being captured.

Subsequently, the controller 180 may light on the pattern light source 200a when the camera 121 captures a third frame after capturing the second frame and may light on the surface light source 200b when the camera 121 captures a fourth frame after capturing the third frame.

Likewise, the surface light source 200b may not emit light while the third frame is being captured, and the pattern light source 200a may not emit light while the fourth frame is being captured.

As shown in FIG. 10, the controller 180 may light on the pattern light source 200a during at least some time while the first frame (or the third frame) is being captured and may light on the surface light source 200b during at least some time while the second frame (or the fourth frame) is being captured.

For example, the controller 180 may control the lighting device 200 so that the pattern light source 200a or the surface light source 200b emits light while a single frame is being captured or may control the lighting device 200 so that neither of the pattern light source 200a and the surface light source 200b emits light for a predetermined time.

The at least some time may refer to a time obtained by subtracting the predetermined time from the whole time during which a single frame is captured.

The reason neither of the pattern light source 200a and the surface light source 200b emits light for the predetermined time while a single frame is being captured is to synchronize a time at which an iris of a camera is opened with a time at which lighting is turned on the basis of a strobe rising signal and also to prevent light emitted by the surface light source from interfering with light emitted by the pattern light source.

Returning to FIG. 9, the controller 180 may acquire a pattern light reception image 910 on the basis that the pattern light source 200a is lit on while the first frame (or the third frame) is being captured.

Here, the pattern light reception image 910 may refer to an image captured while light with a predetermined pattern output by the pattern light source 200a is being emitted to an object.

In detail, the pattern light reception image 910 may include an image including pattern light (or information regarding the pattern light) received by the high-resolution sensor 900 (or the camera 121) when the light with the predetermined pattern output by the pattern light source 200a is emitted to and then reflected by an object.

The pattern light reception image 910 may be an image that is used to extract depth information and may be referred to as a depth image. Here, the first frame (or the third frame) may be a pattern light reception image.

The controller 180 may acquire a surface light reception image 920 on the basis that the surface light source 200b is lit on while the second frame (or the fourth frame) is being captured.

The surface light reception image may refer to an image obtained by capturing while uniform light output by the surface light source 200b is being emitted to an object.

In detail, the surface light reception image may be an image including surface light (or information regarding the surface light) received by the high-resolution sensor 900 (or the camera 121) when the uniform light output by the surface light source 200b is emitted to and then reflected by an object.

The surface light reception image 920 may be an image that is used to extract brightness information and edge information of the object and may be referred to as a black-and-white image or a gray image. Here, the second frame (or the fourth frame) may be a surface light reception image.

The controller 180 may extract depth information through (using) the first frame (or the third frame) captured while the pattern light source 200a is lit on (S912). Here, the depth information may be low-resolution depth information.

In detail, the controller 180 may reduce the resolution of the first frame through a binning process and may extract the low-resolution depth information.

Here, the low-resolution depth information may be extracted through a structured light method when a single camera is provided and may be extracted through a stereo method when two cameras are provided.

Also, the controller 180 may extract at least one of high-resolution brightness information and edge information of the object by using the second frame (or the fourth frame) captured while the surface light source 200b is lit on.

The controller 180 may use the first frame and the second frame captured through the camera 121 to generate a single 3D image.

The high-resolution brightness information may include information such as a contour and a shadow of the object.

That is, it can be understood that the edge information of the object is included in brightness information.

In detail, the controller 180 may extract low-resolution depth information by using the first frame, may extract high-resolution brightness information (including the edge information of the object) by using the second frame, and may combine the high-resolution brightness information with the low-resolution brightness information to extract (or reconfigure) high-resolution depth information (S922, S924).

In order to combine the high-resolution brightness information with the low-resolution brightness information, the controller 180 may use a combination algorithm (e.g., a method of applying an artificial intelligence learning algorithm and an algorithm using shadow information (for example, an RGBD-fusion method)).

Also, the controller 180 may also extract the high-resolution brightness information by using the second frame (S926).

The mobile terminal of the present invention may generate a single 3D image by using two frames.

That is, the controller 180 may extract depth information through a first frame 910 captured while the pattern light source 200a emits light and may extract the high-resolution depth information and the high-resolution brightness information by using a second frame 920 captured while the surface light source 200b emits light.

As shown in FIG. 10, the controller 180 may generate a single 3D image by using two frames, that is, the first frame 910 and the second frame 920.

In short, the controller 180 may alternately turn on the pattern light source 200a and the surface light source 200b to emit light depending on frames and may extract the high-resolution depth information and the high-resolution brightness information by means of only one camera by using the first frame captured while the pattern light source 200a emits light and the second frame captured while the surface light source 200b emits light.

An embodiment of lighting on the pattern light source 200a while the first frame (or the third frame) is being captured will be described below with reference to the accompanying drawings.

Referring to FIG. 11, the pattern light source 200a of the present invention may include a plurality of light emitting devices 1100.

The plurality of light emitting devices 1100 may be provided on a die and may be arranged to form a specific pattern (e.g., a predetermined pattern).

The plurality of light emitting devices may be grouped into a plurality of groups 1110, 1120, 1130, 1140, 1150, 1160, 1170, 1180, and 1190.

The plurality of light emitting devices being grouped into a plurality of groups may denote that the plurality of light emitting devices are controlled by group.

In detail, the controller 180 may control the plurality of groups (or the plurality of light emitting devices) by group.

For example, among the plurality of groups, the controller 180 may independently control light emitting devices included in the first group 1110 and light emitting devices included in the second group 1120.

For example, while the light emitting devices included in the first group 1110 are turned on, the controller 180 may turn off the light emitting devices included in the second group 1120.

It can be understood that the controller 180 controlling the plurality of groups by group denotes that the plurality of light emitting devices 1100 are turned on or off by group. Here, the turning-on of a light emitting device (or the switching of a light emitting device to an on state) may denote lighting on the light emitting device, and the turning-off of a light emitting device (or the switching of a light emitting device to an off state) may denote lighting off the light emitting device.

Meanwhile, the controller 180 may sequentially light on the plurality of groups in a predetermined order.

The predetermined order may be determined at the time of product design or may be changed by user settings.

Referring to FIG. 11, as an example, the predetermined order indicates an order of the first group 1110, the second group 1120, ..., the eighth group 1180, and the ninth group 1190.

In this case, the controller 180 may sequentially light on the plurality of groups in the order of the first group to the ninth group. Here, the lighting-on of a plurality of groups may denote lighting on a plurality of light emitting devices included in the plurality of groups by group.

In this case, when a plurality of light emitting devices included in the first group 1110 are turned on (i.e., emit light), a plurality of light emitting devices included in the second to ninth groups may be turned off (i.e., may not emit light).

Subsequently, when the first group 1110 emits light for a certain time, the plurality of light emitting devices included in the second group 1120 may be turned on, and the first and third to ninth groups may be turned off.

In this way, the controller 180 may sequentially light on the plurality of groups in the predetermined order. In this case, at least two groups cannot emit light at the same time. That is, the controller 180 may control the lighting device so that at least two of the plurality of groups do not emit light not simultaneously, but the plurality of groups alternately emit light.

In other words, as shown in FIG. 11, the controller 180 may light on the plurality of groups such that times during which the plurality of groups emit light do not overlap one another.

In FIG. 11, there is no interval between times during which the first group and the second group are lit on, but the present invention is not limited thereto. There may be a predetermined time interval between the times during which the first group and the second group are lit on (which is the same with cases of the second and third groups, the third and fourth groups, . . . , and the eighth and ninth groups).

As shown in FIG. 11, the controller 180 may define all of the plurality of groups being sequentially lit on as a single set.

A time during which the single set is performed may be determined according to product performance and a control time of the controller 180 and may be constant.

The controller 180 may light on the plurality of groups according to a plurality of sets while the first frame is being captured through a camera.

In detail, as shown in FIG. 11, when the camera captures the first frame, the controller 180 may control the lighting device so that the set in which all of the plurality of groups sequentially emit light in the predetermined order is performed a plurality of times.

According to the present invention, it is possible to reduce peak current needed to light on a plurality of devices by sequentially emitting a plurality of groups in the predetermined order without simultaneously emitting the plurality of groups.

Also, according to the present invention, it is possible to increase the number of emissions of pattern light to an object by performing a set in which all of the plurality of groups are sequentially lit on a plurality of times.

As the number of emissions of pattern light to an object increases, the number of beams of pattern light emitted to and then reflected by the object, which are received by a camera, increases. Thus, it is possible for the controller to easily extract depth information from a depth image.

Here, a time during which a single set in which all of the plurality of groups are sequentially lit on may be constant.

Also, the controller 180 may vary a time during which the first frame is captured. The time during which the first frame is captured may correspond to, for example, a time during which an iris is kept open (or a time during which a closed iris is opened and then re-closed).

The number of the plurality of sets performed while the first frame is being captured may vary depending on the time during which the first frame is captured.

That is, since a time required to perform a single set is constant, the number of times the set is performed may decrease as the time during which the first frame is captured decreases and may increase as the time during which the first frame is captured increases.

Although not shown, the controller 180 may light on the plurality of groups during only one set so that all of the plurality of groups sequentially are lit on just once while the pattern light source 200*a* is lit on.

According to the above configuration of the present invention, it is possible to extract high-resolution high-quality depth information and high-resolution brightness information and to perform face recognition, 3D mapping, or object type classification by combining the depth information and the brightness information.

Also, according to the present invention, it is also possible to use information regarding a shape (a trademark, a mark, or the like) of a character or a painting on a surface as well as a contour of an object by using the depth information and the bright information. This may be performed on the basis of brightness information acquired from a surface light reception image acquired while a surface light source emits light.

Also, according to the present invention, it is possible to perform iris recognition or eye recognition and also recognize information shown in two dimensions (e.g., a trademark, a mark, a painting, a character, etc.) as well as a 3D object.

According to the present invention, the present invention can provide a mobile terminal capable of improving quality of depth information by means of a single camera and a dual lighting device (i.e., a surface light source and a pattern light source).

Also, the present invention can provide a new mobile terminal capable of extracting depth information and edge information by means of only one camera without needing to use a plurality of cameras by alternately lighting on a surface light source and a pattern light source.

Also, the present invention may provide a new control method capable of performing face recognition, eye recognition, and fusion mapping by using a black-and-white image acquired when light is emitted by a surface light source and a depth image acquired when light is emitted by a pattern light source.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A mobile terminal, comprising:
a camera;
a lighting device comprising a pattern light source and a surface light source, wherein the pattern light source is configured to emit light having a defined pattern and the surface light source is configured to emit uniform light; and
a controller configured to:
cause the camera to capture a 3D image;
control the lighting device to cause the pattern light source and the surface light source to alternately emit light, in association with the capturing of the 3D image;
cause the surface light source to stop emitting light when the pattern light source is activated to emit light; and
cause the pattern light source to stop emitting light when the surface light source is activated to emit light.

2. The mobile terminal of claim 1, wherein the controller is further configured to:
cause the pattern light source to activate to emit light when the camera captures a first frame; and
cause the surface light source to activate to emit light when the camera captures a second frame that is captured after the capturing of the first frame.

3. The mobile terminal of claim 2, wherein the controller is further configured to:
cause the pattern light source to activate to emit light when the camera captures a third frame that is captured after the capturing of the second frame; and
cause the surface light source to activate to emit light when the camera captures a fourth frame that is captured after the capturing of the third frame.

4. The mobile terminal of claim 2, wherein the controller is further configured to:
cause the pattern light source to activate to emit light for at least some of a period of time while the camera captures the first frame; and
cause the surface light source to activate to emit light for at least some of a period of time while the camera captures the second frame.

5. The mobile terminal of claim 2, wherein the controller is further configured to:
extract depth information from the first frame; and
extract brightness information and edge information of an object from the second frame.

6. The mobile terminal of claim 2, wherein the controller is further configured to:
generate a single 3D image based on the first frame and the second.

7. The mobile terminal of claim 2, wherein the pattern light source includes a plurality of light emitting devices that are grouped into a single group of lights; and
wherein the controller is further configured to control the plurality of light emitting devices of the single group of lights to repeatedly activate to emit separate instances of light during the capturing of the first frame.

8. The mobile terminal of claim 7, wherein a time during which each of the separate instances of light is emitted is constant, and
wherein a number of times that the single group of lights is repeatedly activated during the capturing of the first frame varies depending on a during which the first frame is captured.

9. The mobile terminal of claim 1, wherein the pattern light source includes a plurality of light emitting devices that are grouped into a plurality of groups, and
wherein the controller is further configured to control the light emitting devices of each group of the plurality of groups.

10. The mobile terminal of claim 9, wherein the controller is further configured to:
cause the light emitting devices of each group of the plurality of groups to sequentially activate to emit light on a group by group basis and in a defined order.

11. The mobile terminal of claim 10, wherein the controller is further configured to:
cause the light emitting devices of each group of the plurality of groups to be activated at discrete time periods such that the emitted light from each group of the plurality of groups do not overlap one another.

12. A mobile terminal, comprising:
a camera;
a pattern light source and a surface light source, wherein the pattern light source is configured to emit light having a defined pattern and the surface light source is configured to emit uniform light; and
a controller configured to:
cause the camera to capture an image comprising a first frame and a second frame; and
cause the pattern light source and the surface light source to alternately emit light, in association with the capturing of the image;
cause the surface light source to stop emitting light when the pattern light source is activated to emit light; and
cause the pattern light source to stop emitting light when the surface light source is activated to emit light.

13. The mobile terminal of claim 12, wherein the controller is further configured to:
cause the pattern light source to activate to emit light while the camera captures the first frame; and
cause the surface light source to activate to emit light while the camera captures the second frame, which is captured after the capturing of the first frame.

14. The mobile terminal of claim 12, wherein the pattern light source includes a plurality of light emitting devices that are grouped into a plurality of groups, and
wherein the controller is further configured to control the light emitting devices of each group of the plurality of groups.

15. The mobile terminal of claim 14, wherein the controller is further configured to:
cause the light emitting devices of each group of the plurality of groups to sequentially activate to emit light on a group by group basis and in a defined order.

16. The mobile terminal of claim 15, wherein the controller is further configured to:
cause the light emitting devices of each group of the plurality of groups to be activated at discrete time periods such that the emitted light from each group of the plurality of groups do not overlap one another.

17. The mobile terminal of claim 12, wherein the image is a 3D image.

* * * * *